(12) United States Patent
Zhang

(10) Patent No.: US 7,386,070 B2
(45) Date of Patent: Jun. 10, 2008

(54) HARDWARE ASSISTED ADJACENT CHANNEL LEAKAGE RATIO MEASUREMENT

(75) Inventor: Joe Zhang, Fremont, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 679 days.

(21) Appl. No.: 10/853,950

(22) Filed: May 26, 2004

(65) Prior Publication Data

US 2005/0265499 A1 Dec. 1, 2005

(51) Int. Cl.
H03D 1/00 (2006.01)

(52) U.S. Cl. ............... 375/343; 375/329; 375/240; 375/146; 375/147; 324/76.29; 324/620

(58) Field of Classification Search ............ 324/76.21, 324/628, 79, 76.29, 620; 375/343, 224, 377, 375/240, 146, 147, 329; 455/67
See application file for complete search history.

(56) References Cited

U.S. PATENT DOCUMENTS 4,810,960 A * 3/1989 Owen et al. ............. 324/76.44
5,808,463 A * 9/1998 Nagano .................. 324/76.21
6,046,987 A * 4/2000 Tagawa .................... 370/252
2004/0070386 A1 * 4/2004 Muto et al. .............. 324/76.29

OTHER PUBLICATIONS

Agilent Technologies, "3GPP W-CDMA Design Library" Dec. 2003, available from Agilent Techolies 395 Page Mill Road, Palo Alto, CA 94304, www.Agilent.com; pp. 28-14 through 28-19 and 31-18 through 31-22.

* cited by examiner

Primary Examiner—Shuwang Liu
Assistant Examiner—Kabir A Timory

(57) ABSTRACT

A tester module is used to perform an adjacent channel leakage ratio measurement. The tester module includes a translation block, a first filter, a re-sampler, a memory, a router, a second filter and a power detector. The translation block translates a received intermediate frequency signal to a baseband signal. The first filter compensates amplitude and phase of the baseband signal for any unflatness in host hardware used to capture the received intermediate frequency signal. The re-sampler decimates the compensated baseband signal. The memory stores the decimated compensated baseband signal. The router reroutes the stored decimated compensated baseband signal to the re-sampler. The re-sampler resamples the rerouted stored decimated compensated baseband signal to perform spectrum shifting. The second filter performs a low pass filtering operation on the resampled rerouted stored decimated compensated baseband signal. The power detector detects channel power of the filtered resampled rerouted stored decimated compensated baseband signal.

20 Claims, 4 Drawing Sheets

HARDWARE ASSISTED ADJACENT CHANNEL LEAKAGE RATIO MEASUREMENT

BACKGROUND

Adjacent channel leakage ratio (ACLR) is the ratio of power measured in an adjacent channel to transmitted power. In the case of wideband code division multiple access (W-CDMA), both the transmitted power and the adjacent channel power are measured with a filter that has a root raised-cosine (RRC) filter response with rolloff of a=0.22 and a bandwidth equal to the chip rate.

ACLR is one of the most important measurements in the wireless communication industry. Performing ACLR with measurement precision (or repeatability) and speed are important factors when minimizing manufacturing and testing costs for wireless communication devices.

In the case of W-CDMA (also called spread spectrum) manufacturing, the 3GPP specifications require measurements of the power ratios of two adjacent channels (+/−5 MHz offset from the carrier frequency) and two alternative channels (+/−10 MHz offset from the carrier frequency) over the carrier channel power. For ACLR, sufficient dynamic range is required, for example, −65 decibels referred to the carrier (dBc) for the case of the base station manufacturing test. In order to achieve higher measurement accuracy for channel power, longer observation time is needed. This typically results in lower measurement speed.

For example, when performing ACLR using an Agilent E4406A Vector Signal Analyzer or using an Agilent PSA series High-Performance Spectrum Analyzer (e.g., E4443A, E4445A, E4440A, E4446A or E4448A, PSA Series Spectrum Analyzer), fast Fourier transform (FFT) or swept mode is used to acquire a spectrum trace. An RRC filter is applied in the frequency domain. The spectrum trace is integrated to determine channel power at each offset (including the carrier channel). All the mathematical calculations are typically performed on a host central processing unit (CPU).

For example, using an Agilent PSA series High-Performance Spectrum Analyzer in swept mode, narrow resolution bandwidth (RBW) is required to make sure the spectrum trace has enough resolution to present the RRC filter shape. Also, long enough sweep time is needed to achieve the measurement accuracy.

For example, using an Agilent E4406A Vector Signal Analyzer or using an Agilent PSA series High-Performance Spectrum Analyzer in FFT mode, three dominant factors impact measurement performance. First, the local oscillators (LOs) used for testing must be re-tuned several times to accommodate the ACLR requirement to analyze around 25 MHz of bandwidth. Each LO retuning takes about 5 milliseconds (ms), which is a relatively long time. Second, the speed of the FFT and RRC filter operation is limited by the host CPU. Third, data transfer from a data capture memory to the host is time consuming.

SUMMARY OF THE INVENTION

In accordance with embodiments of the present invention, a tester module is used to perform an adjacent channel leakage ratio measurement. The tester module includes a translation block, a first filter, a re-sampler, a memory, a router, a second filter and a power detector. The translation block translates a received intermediate frequency signal to a baseband signal. The first filter compensates amplitude and phase of the baseband signal for any unflatness in host hardware used to capture the received intermediate frequency signal. The re-sampler decimates the compensated baseband signal. The memory stores the decimated compensated baseband signal. The router reroutes the stored decimated compensated baseband signal to the re-sampler. The re-sampler resamples the rerouted stored decimated compensated baseband signal to perform spectrum shifting. The second filter performs a low pass filtering operation on the resampled rerouted stored decimated compensated baseband signal. The power detector detects channel power of the filtered resampled rerouted stored decimated compensated baseband signal.

DESCRIPTION OF THE EMBODIMENT

Figure 1:
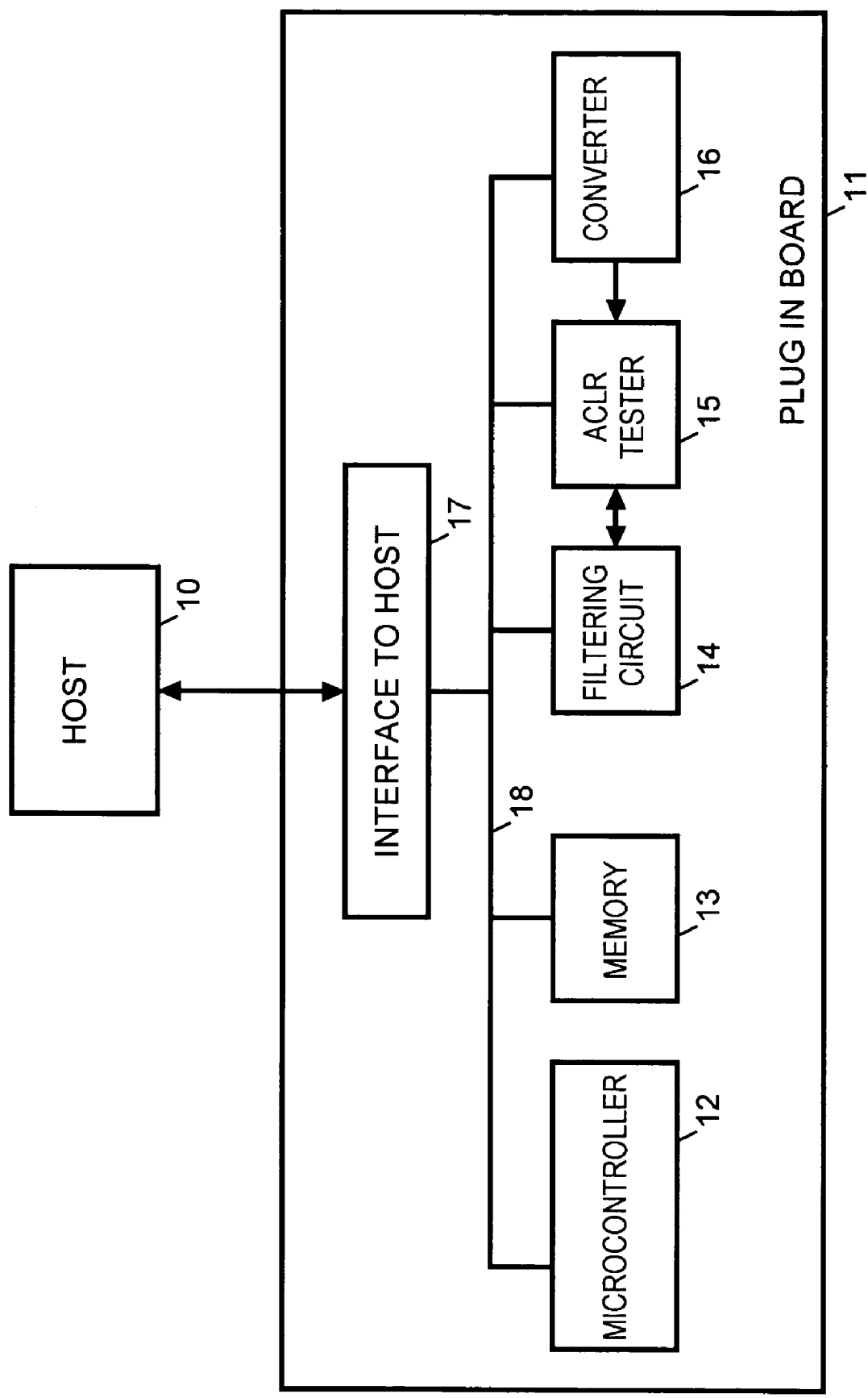
FIG. 1 is a simplified block diagram of a test module added to an analyzer system in accordance with an embodiment of the present invention.

FIG. 1 is a simplified block diagram of a test module added to a host system 10. For example host system 10 is a spectrum analyzer system such as an Agilent PSA series High-Performance Spectrum Analyzer, available from Agilent Technologies, Inc. Alternatively, host system 10 is some other type of analyzer system such as a vector signal analyzer. The test module is, for example, implemented as a daughter board for use by host system 10.

The test module includes a host interface 17, a microcontroller 12, memory 13, a filtering circuit 14, a tester circuit 15 and a converter interface 16 connected via a bus 18.

For example, host interface 17 is a peripheral component interconnect PCI bus standard compatible interface. Microcontroller 12 is, for example, implemented using a PowerPC compatible reduced instruction set computer (RISC) microprocessor available from IBM or Motorola, Inc.

For example, converter interface 16 receives from host system 10 hardware intermediate frequency (IF) analog data and performs analog-to-digital conversion at an intermediate frequency. Alternatively, the hardware intermediate frequency (IF) digital data can be received from host system 10 via host interface 17. For a W-CDMA system, the IF digital data is generated, for example, by sampling an analog signal at an intermediate frequency (e.g., 50 MHz-100 MHz) to generate imaginary/quadrature (IQ) data.

For example, filtering circuit 14 is an application specific integrated circuit (ASIC) that performs filtering, resampling and filtering in series. For example, test circuit 15 is a field programmable gate array (FPGA) that is programmed to perform intermediate to base-band conversion, and to perform power detection. While filtering circuit 14 and test circuit 15 are shown implemented as two separate integrated circuits, in alternative embodiments of the present invention, the functionality of filtering circuit 14 and test circuit 15 can be implemented on a single integrated circuit, or on greater than two integrated circuits.

Figure 2:
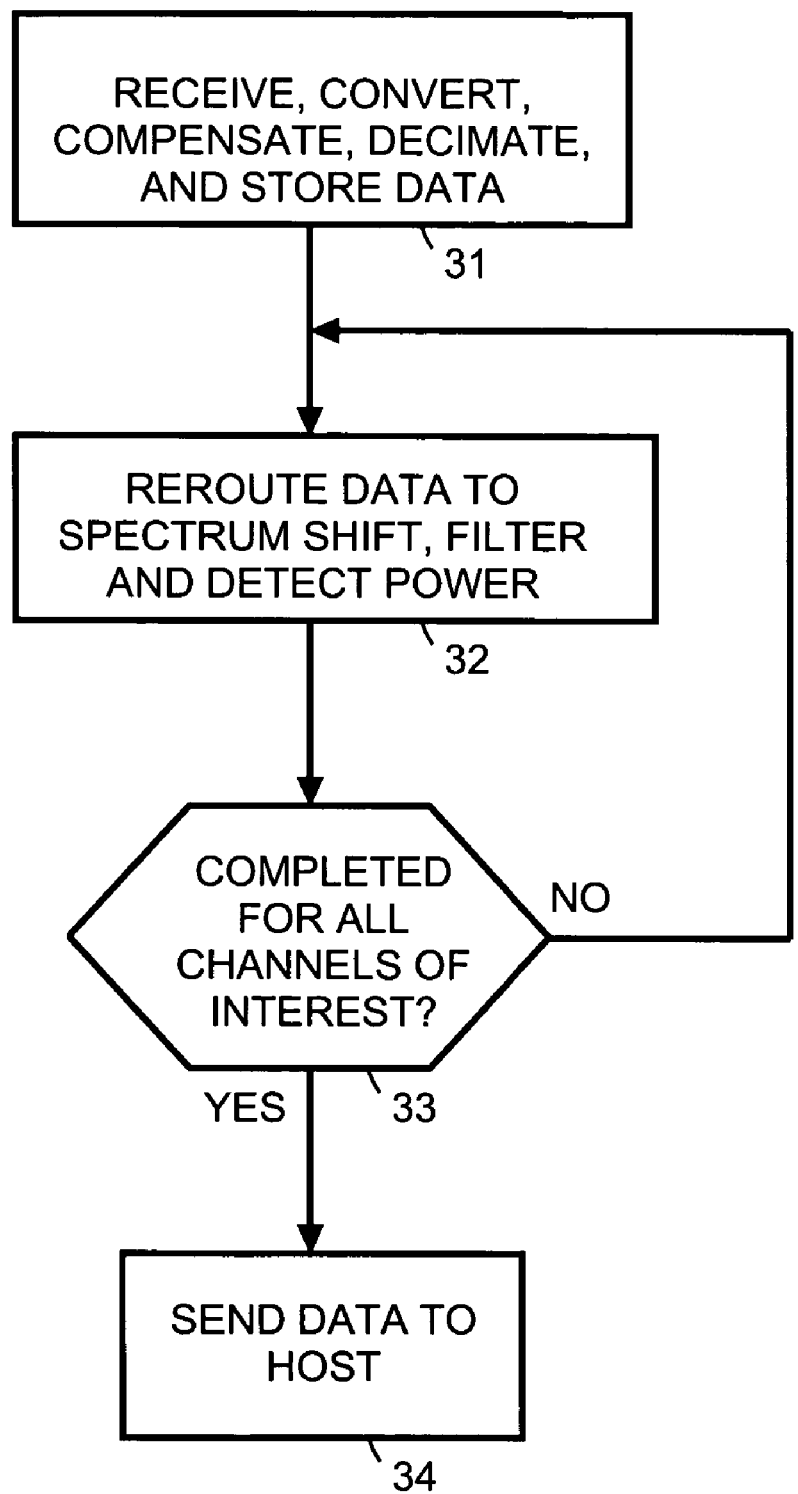
FIG. 2 is a flowchart that illustrates an adjacent channel leakage ratio (ACLR) test performed using the test module shown in FIG. 1 during signal capture in accordance with an embodiment of the present invention.

FIG. 2 is a flowchart that shows an adjacent channel leakage ratio (ACLR) test performed using the test module. In a block 31, data is received, converted, compensated, decimated and stored. This is illustrated in FIG. 3.

Figure 3:
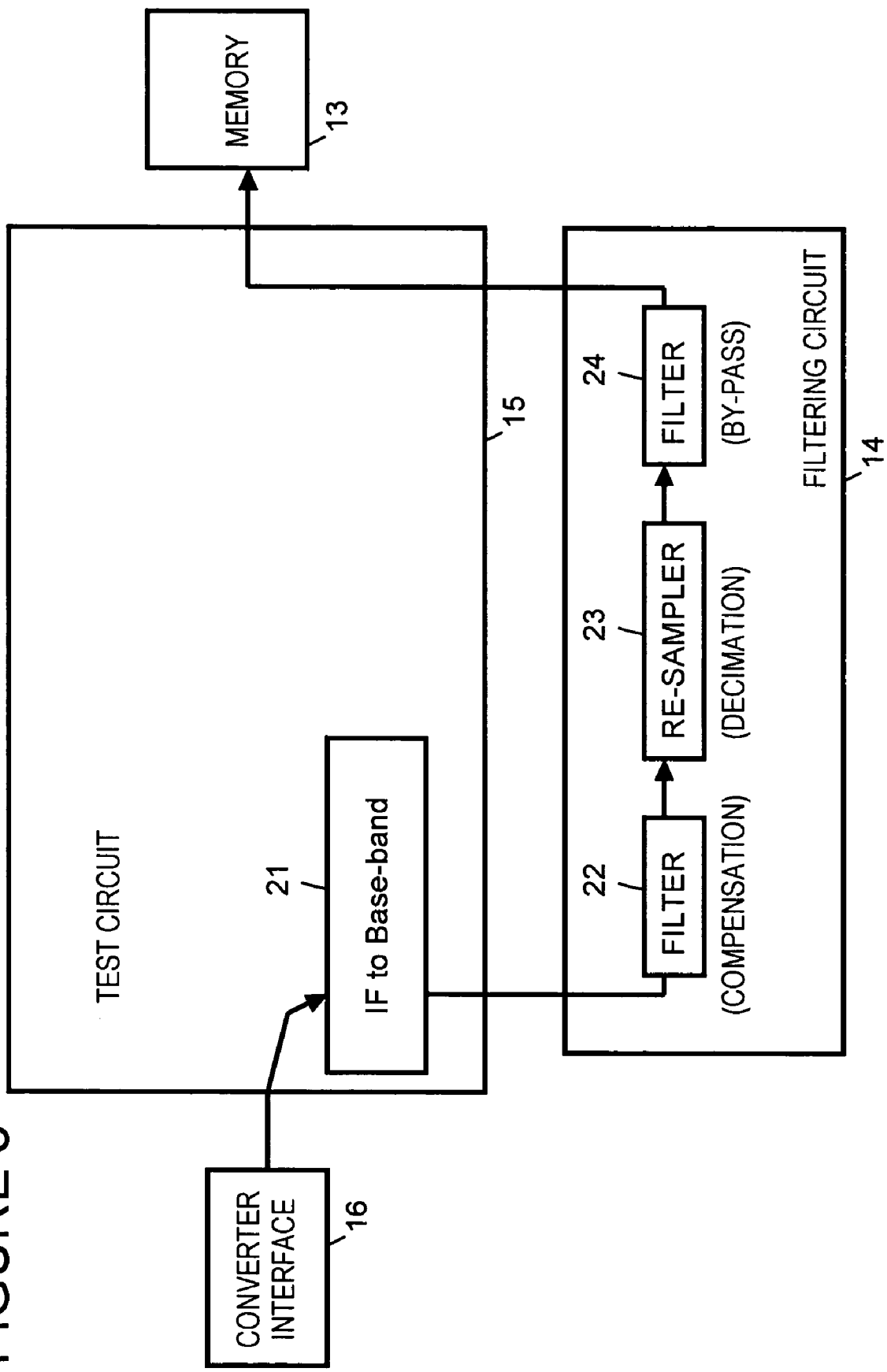
FIG. 3 is a simplified block diagram of the test module shown in FIG. 1 during signal capture in accordance with an embodiment of the present invention.

In FIG. 3, converter interface 16 forwards to test circuit 15 a digital signal that has, for example, been captured as calibrated baseband IQ data at an intermediate frequency (e.g., 50 MHz). As illustrated by IF to baseband block 21, test circuit 15 performs a down conversion from the intermediate frequency to the baseband for the encoded information. The baseband frequency information is forwarded by test circuit 15 to filtering circuit 14. A first filter 22 of filtering circuit 14 is set to compensate the amplitude and phase of the encoded information for any unflatness caused by host system 10. For example, first filter 22 is a finite impulse response (FIR) filter.

A re-sampler 23 of filtering circuit 14 is set to perform decimation of the signal so that the sampling rate of the signal is reduced in order to reduce the amount of data to be stored. A filter 24 of filtering circuit 14 is placed in bypass mode to allow the data to flow to memory 13 without further modification. The data is stored in memory 13 for processing.

In a block 32, shown in FIG. 2, the data stored in memory 13 is rerouted through test circuit 15. A spectrum shift operation, filtering operation and power detection is performed on the data to produce a channel power value that is stored within memory 13. This is illustrated by FIG. 4.

Figure 4:
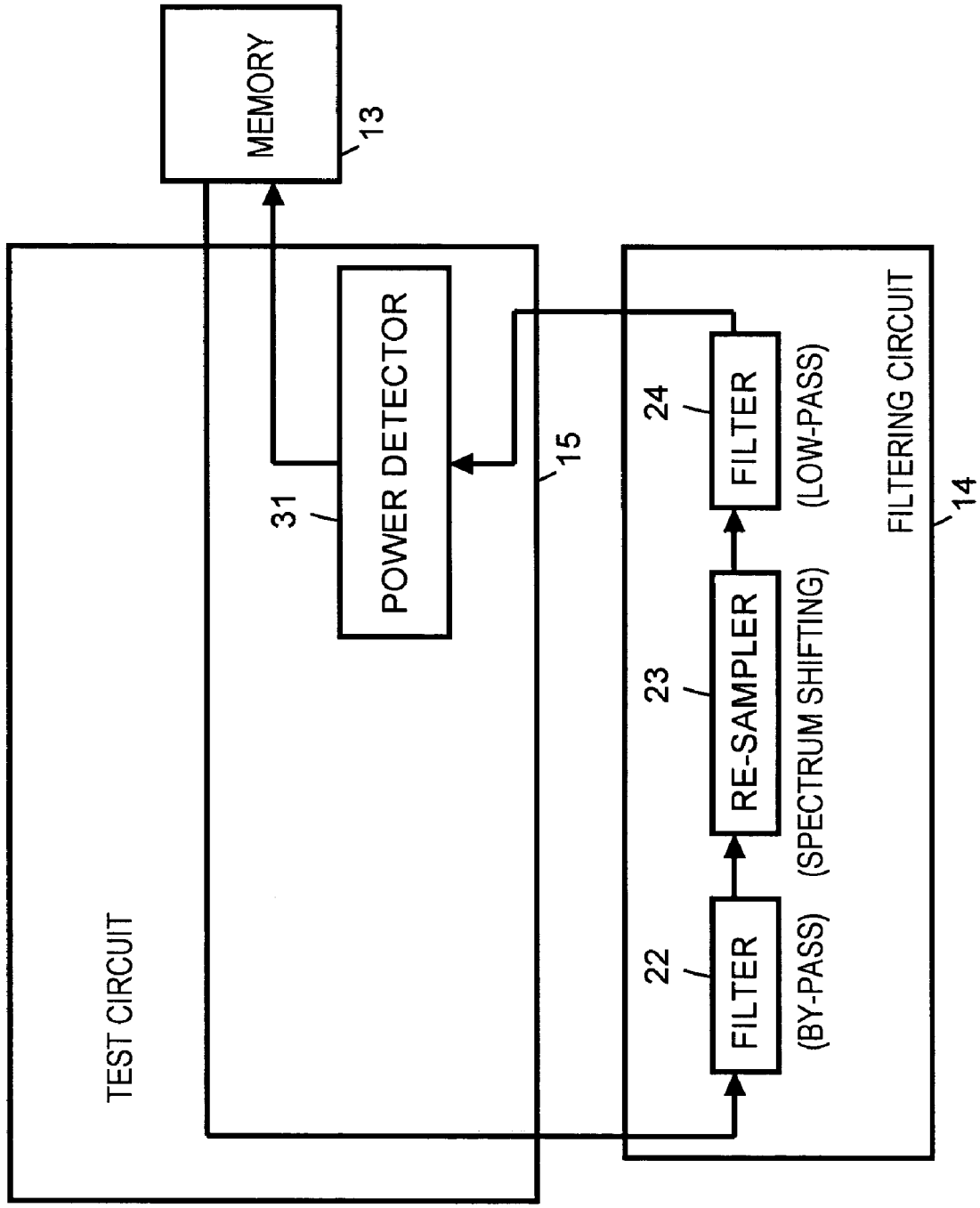
FIG. 4 is a simplified block diagram of the test module shown in FIG. 1 during signal re-sampling in accordance with an embodiment of the present invention.

In FIG. 4, data stored in memory 13 is re-routed by test circuit 15 to filter 22 of filtering circuit 14. Filtering circuit 22 is in bypass mode so the data is bypassed to re-sampler 23. Re-sampler 23 performs a spectrum shift along with a further decimation to reduce the amount of data. For example, a single carrier W-CDMA system ACLR test requires a measurement of power at the carrier frequency, at +5 MHz from the carrier frequency, at −5 MHz from the carrier frequency, at +10 MHz from the carrier frequency and at −10 MHz from the carrier frequency. At each pass of the data through re-sampler 23 a different amount of spectrum shift occurs. For example, in the first pass, re-sampler 23 shifts the spectrum by −10 MHz. In the second pass, re-sampler 23 shifts the spectrum by −5 MHz. In the third pass, re-sampler 23 shifts the spectrum 0 MHz. In the fourth pass, re-sampler 23 shifts the spectrum by +5 MHz. In the fifth pass, re-sampler 23 shifts the spectrum by +10 MHz.

Filter 24 of filtering circuit 14 is in a low pass filter mode and acts as a 3.84 MHz root raised cosine (RRC) low-pass filter. Within test circuit 15, a power detector 31 performs a root mean square (rms) magnitude detection. The detected rms magnitude is converted into absolute power in decibels referred to 1 milliwatt (dBm).

In a block 33, shown in FIG. 2, a check is made to see whether the power detection has been performed for all the channels of interest. For the single carrier W-CDMA system ACLR test, this requires five passes: measurement of power at the carrier frequency, at +5 MHz from the carrier frequency, at −5 MHz from the carrier frequency, at +10 MHz from the carrier frequency and at −10 MHz from the carrier frequency. As long as host system 10 has wide enough IF bandwidth, test module 11 can be used to support multi-carrier W-CDMA system ACLR (e.g. more than five passes).

When power is detected for all channels of interest, in a block 34, then detected power for each channel data is sent to host system 10. Alternatively, it is not necessary to wait for channel power to be detected for all channels before sending the resulting values to host system 10. At the end of each pass, the values can be forwarded to host system 10.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A tester module used to perform an adjacent channel leakage ratio measurement, the tester module comprising:
    a translation block that translates a received intermediate frequency signal to a baseband signal;
    a first filter that compensated amplitude and phase of the baseband signal for any unflatness in a host hardware used to capture the received intermediate frequency signal;
    a re-sampler that decimates the compensated baseband signal;
    a memory that stores the decimated compensated baseband signal;
    a router that reroutes the stored decimated compensated baseband signal to the re-sampler, the re-sampler resampling the rerouted stored decimated compensated baseband signal to perform spectrum shifting;
    a second filter that performs a low pass filtering operation on the resampled rerouted stored decimated compensated baseband signal; and
    a power detector that detects a channel power of the filtered resampled rerouted stored decimated compensated baseband signal.

2. A tester module as in claim 1 wherein the router reroutes the stored decimated compensated baseband signal to the re-sampler five times, the re-sampler performing a different spectrum shifting upon each rerouting.

3. A tester module as in claim 1 wherein the router reroutes the stored decimated compensated baseband signal to the re-sampler five times, the re-sampler performing a different spectrum shifting upon each rerouting, the spectrum shifting being the following amounts:
    −10 MHz
    −5 MHz
    0 MHz
    +5 MHz
    +10 MHz.

4. A tester module as in claim 1 wherein the tester module includes a microcontroller.

5. A tester module as in claim 1 wherein the router routes the stored decimated compensated baseband signal through the first tilter to the re-sampler, the first filter being in a bypass mode.

6. A tester module as in claim 1 wherein the decimated compensated baseband signal passes through the second filter on the way to the memory, the second filter being in a bypass mode.

7. A tester module as in claim 1 wherein the translation block and the power detector reside in a tester circuit while the first filter, the re-sampler and the second filter reside in a filtering circuit.

8. A tester module as in claim 1 wherein the re-sampler decimates the rerouted stored decimated compensated baseband signal.

9. An analyzer system, comprising:
    a system hardware that receives an analog signal and produces an intermediate frequency signal;
    a translation block that translates the intermediate frequency signal to a baseband signal;

a first filter that compensates amplitude and phase of the baseband signal for any unflatness the system hardware;

a re-sampler that decimates the compensated baseband signal;

a memory that stores the decimated compensated baseband signal;

a router that reroutes the stored decimated compensated baseband signal to the re-sampler, the re-sampler resampling the rerouted stored decimated compensated baseband signal to perform spectrum shifting;

a second filter that performs a low pass filtering operation on the resampled rerouted stored decimated compensated baseband signal; and a power detector that detects a channel power of the filtered resampled rerouted stored decimated compensated baseband signal.

10. An analyzer system as in claim 9 wherein the analyzer system is a spectrum analyzer.

11. An analyzer system as in claim 9 wherein the translation block, the first filter, the re-sampler, the memory, the router, the second filter and the power detector are all located on a daughter board within the analyzer system.

12. A tester module used to perform an adjacent channel leakage ratio measurement, the tester module comprising:

a translation block means for translating a received intermediate frequency signal to a baseband signal;

a first filter means for compensating amplitude and phase of the baseband signal for any unflatness in a host hardware used to capture the received intermediate frequency signal;

re-sampler means decimating the compensated baseband signal;

a memory for storing the decimated compensated baseband signal;

means for rerouting the stored decimated compensated baseband signal to the re-sampler means, the re-sampler resampling the rerouted stored decimated compensated baseband signal to perform spectrum shifting;

a second filter means for performing a low pass filtering operation on the resampled rerouted stored decimated compensated baseband signal; and a power detection means for detecting a channel power of the filtered resampled rerouted stored decimated compensated baseband signal.

13. A tester module as in claim 12 wherein the means for rerouting reroutes the stored decimated compensated baseband signal to the re-sampler means five times, the re-sampler means performing a different spectrum shifting upon each rerouting.

14. A tester module as in claim 12 wherein the means for rerouting reroutes the stored decimated compensated baseband signal to the re-sampler five times, the re-sampler means performing a different spectrum shifting upon each rerouting, the spectrum shifting being the following amounts:

−10 MHz

−5 MHz

0 MHz

+5 MHz

+10 MHz.

15. A tester module as in claim 12 wherein the means for rerouting routes the stored decimated compensated baseband signal through the first filter to the re-sampler means, the first filter means being in a bypass mode.

16. A tester module as in claim 12 wherein the decimated compensated baseband signal passes through the second filter means on the way to the memory, the second filter means being in a bypass mode.

17. A tester module as in claim 12 wherein the translation means and the power detection means reside in a tester circuit while the first filter means, the re-sampler means and the second filter means reside in a filtering circuit.

18. A tester module as in claim 12 wherein the re-sampler means decimates the rerouted stored decimated compensated baseband signal.

19. A method used to perform an adjacent channel leakage ratio measurement, the method comprising:

translating a receiver intermediate frequency signal to a baseband signal;

compensating, by a re-sampler, amplitude and phase of the baseband signal for any unflatness in a host hardware used to capture the received intermediate frequency signal;

decimating the compensated baseband signal;

storing the decimated compensated baseband signal;

rerouting the stored decimated compensated baseband signal to the re-sampler, the re-sampler resampling the rerouted stored decimated compensated baseband signal to perform spectrum shifting;

performing a low pass filtering operation on the resampled rerouted stored decimated compensated baseband signal; and detecting a channel power of the filtered resampled rerouted stored decimated compensated baseband signal.

20. A method as in claim 19 wherein the rerouting to the re-sampler is performed five times, the re-sampler performing a different spectrum shifting upon each rerouting.

* * * * *